United States Patent [19]

Heiermann et al.

[11] Patent Number: 5,452,629
[45] Date of Patent: Sep. 26, 1995

[54] DEVICE FOR SELECTIVELY TENSIONING AND CLAMPING STUDS MOUNTED ON A PRESSURE VESSEL TO PERMIT NUTS TO BE TIGHTENED OR LOOSENED

[75] Inventors: Siegfried Heiermann, Waltrop; Horst Westerfeld, Castrop Rauxel, both of Germany

[73] Assignee: Westfalia Becorit Industrietechnik GmbH, Germany

[21] Appl. No.: 231,128

[22] Filed: Apr. 22, 1994

[30] Foreign Application Priority Data

Apr. 27, 1993 [DE] Germany .................. 43 13 778.4

[51] Int. Cl.⁶ .................................................. B25B 29/02
[52] U.S. Cl. ........................................ 81/57.38; 254/29 A
[58] Field of Search .......................... 81/57.38; 73/761, 73/862.381; 254/29 A

[56] References Cited

U.S. PATENT DOCUMENTS 3,844,533 10/1974 Markiewicz et al. .
4,773,146 9/1988 Bunyan ........................ 81/57.38 X
5,271,297 12/1993 Heiermann et al. .
5,330,159 7/1994 Heiermann et al. .............. 254/29 A

FOREIGN PATENT DOCUMENTS 1444606 8/1976 Germany .

Primary Examiner—James G. Smith
Attorney, Agent, or Firm—Samuels, Gauthier & Stevens

[57] ABSTRACT

Apparatus for tightening and releasing nuts on screw-threaded studs to fit or release a cover on a pressure vessel employs several devices for subjecting each of the studs to tension to clamp the stud whilst the nut is rotated thereon. Each device has a passage for receiving one of the studs and a threaded sleeve engaged thereon. An hydraulic piston and cylinder unit subjects the sleeve to tensile force and likewise the stud coupled thereto. Also in the passage there is a sensor which has spring biased relatively movable components for engaging on a head of the stud and on a system of rods providing a reference. The sensor is suspended in the passage and provides an indication of the strain imposed on the stud by the hydraulic unit.

18 Claims, 3 Drawing Sheets

DEVICE FOR SELECTIVELY TENSIONING AND CLAMPING STUDS MOUNTED ON A PRESSURE VESSEL TO PERMIT NUTS TO BE TIGHTENED OR LOOSENED

FIELD OF THE INVENTION

The present invention relates in general to apparatus for securing and releasing nuts on screw-threaded members in order to fit or remove a cover of a pressure vessel. In the case of reactor pressure vessels for nuclear fuels, access for personnel is restricted and hence the apparatus needs to perform its function automatically remote from human operatives. The screw-threaded members are usually engaged in tapped blind bores in the pressure vessel and in order to secure and release the nuts it is necessary to employ a clamping device to subject each of the screw-threaded members to axial tension before the nut thereon is rotated otherwise the rotation of the nut could cause the screw-threaded member to rotate in its blind bore in the pressure vessel.

BACKGROUND OF THE INVENTION

Apparatus and devices of the type with which the invention is concerned are described in U.S. Pat. No. 5,271,297 and in U.S. patent application Ser. No. 08/005,560 filed Jan. 19th, 1993 in the name Siegfried Heiermann both assigned to the same assignee as this application. A tensioning or clamping apparatus is also described in GB 1444606 in which piston and cylinder units supported on a carrier ring subject couplings on the screw-threaded members to tensile force. In this arrangement, each of the couplings and the heads of the screw-threaded members have inter-engageable jaws and grooves. The nuts on the screw-threaded members lie beneath the couplings relative to the vessel and are rotated with a special drive having a pinion wheel which can pass through apertures in the carrier ring to mesh with teeth on the nuts. When one of the nuts is connected to the drive and is to be rotated an associated piston and cylinder unit is charged with pressure fluid to lift the coupling and brace the screw-threaded member so the nut can be rotated on the screw-threaded member.

U.S. Pat. No. 3,844,533 also describes a tensioning or clamping device which is moved from one member to the next to perform its function.

The known apparatuses and devices cannot ensure that all the screw-threaded members are subjected to the same tensioning forces since the individual screw-threaded members often require tensioning forces of different values. It is above all desirable to tighten the nuts on the cover to a uniform extent to provide a good seal.

It is a general object of the invention to provide an improved apparatus and device which can ensure more uniform tensioning of the screw-threaded members.

SUMMARY OF THE INVENTION

According to the invention there is provided apparatus for use in tightening or releasing nuts engaged on screw-threaded members supported in screw-threaded bores of a pressure vessel in order to secure or release a cover of the vessel. The apparatus employs a clamping device for subjecting the screw-threaded members to tension to permit release or tightening of the nuts thereon; said device comprising hydraulic means to exert force on one of the members and said device incorporating a strain gauge sensor which is locatable adjacent an upper end of the one member to detect relative movements and produces an output representing the strain in the member caused by the hydraulic means.

The sensor generally picks up the movements of some part brought about by tensioning of the member and this movement is converted in electrical signals. These signals can be used to control the tensioning operation to ensure uniform nut setting. The output signals can be fed to a control unit whereat, on reaching a sensed pre-set value and tension, the unit can interrupt the supply of pressure fluid to the hydraulic means or initiate the nut turning operation.

The sensor may be of a linear displacement type with sensor components which interact as a linear potentiometer.

It is however possible to use other types of sensor such as inductive or photo-electric or opto-electronic sensors. It is preferable to adopt a reliable sensor of simple construction.

In a preferred embodiment, the sensor is of elongate structure located above the screw-threaded member and is adjustable to make contact with the head of the screw-threaded member or with a coupling connection thereon. This compact design enables the sensor to be suspended and inserted into a passage in a base carrier which fits onto the screw-threaded member and has the hydraulic means supported thereon or incorporated therewith. The sensor may comprise a measuring head which is adjustably supported by a carrier and has a pair of components relatively displaceable axially of the screw-threaded member and means for subjecting the components to a resilient biasing force. One of the components is then locatable to displace in accordance with the tensile force imparted to the screw-threaded member in opposition to the spring force.

The one component can be supportable on the coupling connection joined with the screw-threaded member and extendible therewith while the other component can engage with a rod fitted in an axial bore in the screw-threaded member and arranged to remain fixed while the screw-threaded member extends due to the tensile force.

The one component can be in the form of a cylindrical part surrounding the other part and having a cup member suspended from the carrier by spring means. The cup member may have internal supports or projections for engaging on the end of a threaded sleeve serving as part of the coupling connection mounted on the screw-threaded member for extension therewith as the screw-threaded member is subjected to the tensile force.

The cup member can be subjected to the spring force to hold this component on the screw-threaded member or its coupling connection. The other component of the sensor can be guided through the cup member and connected between the sensor carrier and some reference system which remains fixed when the screw-threaded member extends under tension. The reference system can take the form of a series of rods passing axially through the screw-threaded member and through the coupling connection and anchored to the base region of the screw-threaded member.

The sensor carrier can be a hollow tube and an electrical cable for transmitting the electrical signals from the sensor can be passed through the carrier tube.

The coupling connection or sleeved parts fitted to the screw-threaded member can be of known design serving to transmit rotary drive to the screw-threaded member to cause this member to be screwed into or out from its associated bore in the pressure vessel. The connection can at least include an adaptor connected to the end of the screw-threaded member with means resisting tensile and rotational forces therebetween and with which the screw-threaded member is driven in or out of the screw-threaded bore in the vessel. The series of rods may be at least partially guided within the adaptor and a spring may hold the rods together. The means resisting rotational forces between the adaptor and the screw-threaded member may comprise a polygonal faced contact between an interior of the adaptor and an exterior of an end region of the screw threaded member.

The means resisting tensile forces may comprise a further threaded sleeve engaging in the bore of the adaptor and having a collar engaging on one end of the adaptor adjacent the sensor. The sleeve guides the rod or rods and the spring and engages with a threaded end in a threaded bore in the head of the screw-threaded member.

This arrangement is particularly useful since the adaptor can be easily and quickly fitted or detached.

The sensor is also normally located for performing its measurement function in the passage in the base carrier for the hydraulic means as mentioned previously. To transfer the tensioning force to the screw-threaded member the hydraulic tensioning means can engage with a threaded coupling sleeve detachably screwed onto the screw-threaded member. The sensor and the coupling connection on the head of the screw-threaded member can all be accommodated in the coupling sleeve. In such an arrangement, the sensor can be disposed below a first drive for rotating the coupling sleeve and above a second drive for rotating a nut on the screw-threaded member.

The hydraulic tensioning means can itself take the form of a cylinder surrounding the threaded coupling sleeve and supported on the base carrier and an annular piston also surrounding the threaded coupling sleeve and engageable through a thrust ring on a collar of the threaded coupling sleeve.

The sensor carrier can be suspended along with the base carrier so as to be movable as a unit from one screw-threaded member to another.

The base carrier, which usually rests on a flange of the vessel cover, can be of ring shape or shaped as a ring segment adapted to conform with the pitch circle of the screw-threaded members on the vessel. The same carrier can thus serve to support several clamping devices and associated sensors permitting several screw-threaded members to be subjected to measured tension at the same time.

The invention may be understood more readily, and various other aspects and features of the invention may become apparent, from consideration of the following description:

BRIEF DESCRIPTION OF DRAWINGS

An embodiment of the invention will now be described, by way of example only, with reference to the accompanying drawings, wherein.

DESCRIPTION OF PREFERRED EMBODIMENT

Figure 1:
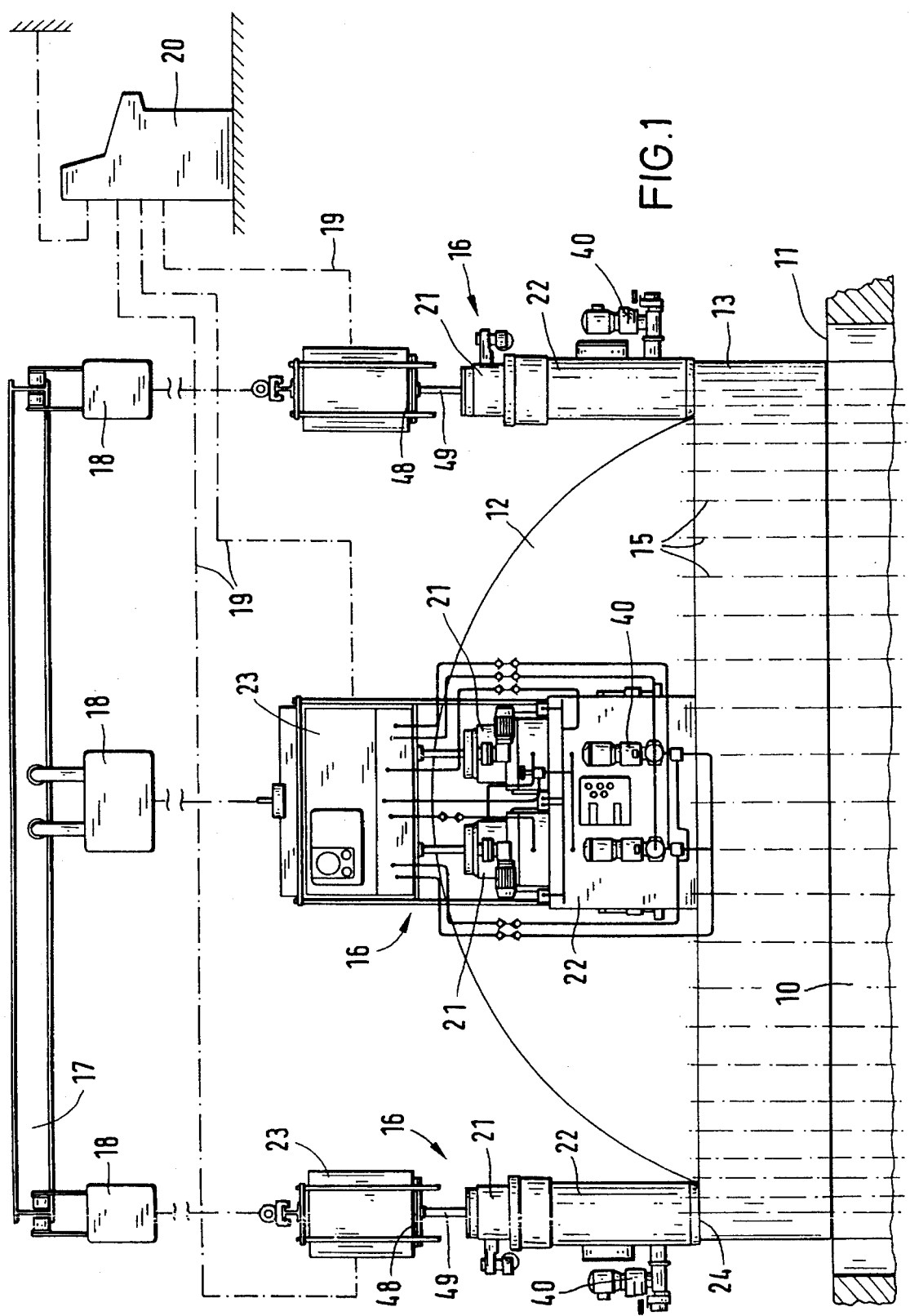
FIG. 1 is a schematic representation of part of a pressure vessel in association with apparatus with several clamping or tensioning devices constructed in accordance with the invention.

In FIG. 1, the upper region of a pressure vessel 10, such as a reactor pressure vessel for nuclear fuels, is represented aswell as a cover 12 equipped with a flange 13 which fits on an upper rim 11 of the vessel 10.

The cover 12 is attached and clamped onto the vessel 10 with the aid of screw-threaded members (14, FIGS. 2 and 3) such as studs or bolts, which engage in tapped blind bores in the rim 11 of the vessel 10 and pass through bores in the cover 12. Nuts (39, FIG. 2) are fitted on the members 14 to secure and seal the cover 12 to the vessel 10. The screw-threaded members are simply represented by centre lines 15 in FIG. 1. Engaged on the flange 13, there are three clamping or tensioning devices 16 which are equi-spaced around the periphery of the flange 13 and the pitch circle of the members 14. Above the cover 12, there is a circular track 17 concentric with the flange 13 of the cover 12 on which there are guided mobile trolleys 18 for lifting and displacing the devices 16. The devices 16 are connected via cables to a control unit 20 which co-ordinates the operations of the devices 16 and the various operations involved in fitting or releasing the cover 12.

Each device 16 has two hydraulic piston and cylinder units 21 carried on a common base carrier 22 and supplied with hydraulic pressure fluid from a common pump unit 23 suspended from one of the trolleys 18. The base carrier 22 can be common to all the devices 16 or just the units 21 of one device 16 and can be of circular or of part circular configuration matching the pitch circle of the members 14. The units 21 are disposed symmetrically on the base carrier 22 and take the form shown in FIG. 2.

Figure 2:
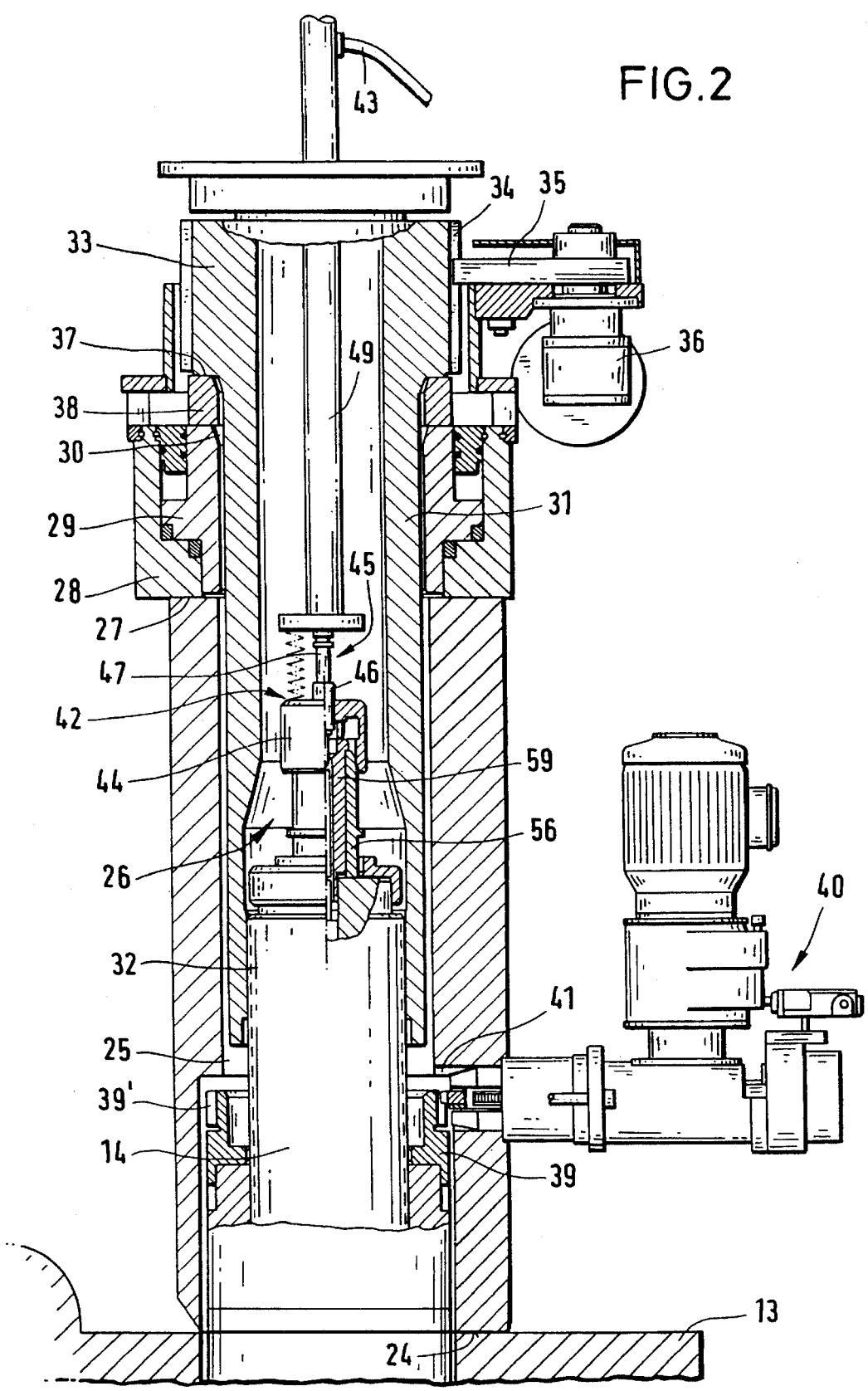
FIG. 2 is a longitudinal section through a device constructed in accordance with the invention and FIG. 3 is a longitudinal section through part of the device shown in FIG. 2 but taken on a somewhat larger scale.

As shown in FIG. 2, the base carrier 22 has its underside 24 in direct contact with the flange 13. The carrier 22 has a main passage 25 associated with one of the units 21 which receive one of the members 14 and its head coupling connection 26.

At an upper region 27 of the base 22, there is one of the piston and cylinder units 21 which has a cylinder 28 coaxial with the passage 25. An associated annular piston 29 in the cylinder 28 has a through bore 30 aligned with the passage 25 for receiving an internally threaded coupling sleeve 31 for engaging on an upper threaded region 32 of the member 14. In order to rotate the sleeve 31 to tighten it onto the member 14 the sleeve 31 is provided with a collar 33 with a toothed rim 34 at its upper end which meshes with a pinion 35 as the output gear of a drive 36. The collar 33 has a shoulder 37 which provides an abutment for a thrust ring 38 engaged between the upper end of the piston 29 and the shoulder 37. Below the sleeve 31 in the passage 25, there is also a nut 39 which can be tightened against the flange 13 and which is in screw-threaded engagement with the member 14. To rotate the nut 39 there is a drive 40 which can be disposed in relation to the base carrier 22 to make drivable engagement with a toothed rim 39' of the nut 39. One or both drives 36, 40 can be electrically powered.

In order to rotate the nut 39 with the aid of the drive 40 it is necessary to subject the member 14 to tension and to clamp the member 14 to avoid the member 14 from rotating aswell. This is achieved by bringing one of the devices 16 into position with its associated trolley 18 and lowering the device 16 to bring the base carrier 22 into contact with the flange 13 with the member 14 engaging in the passage 25. The sleeve 31 is now engaged on the member 14 above the nut 39 and is tightened with the drive 36. The cylinder 28 is charged with pressure fluid so that the piston 29 is raised to urge the thrust ring 38 upwardly against the shoulder 37 and to cause the sleeve 31 to exert axially directed tensile force on the member 14. Depending on whether the cover 12 is to be removed or fitted, the nut 39 can be now be tightened or loosened with the drive 40.

In accordance with the invention, each piston and cylinder unit 21 with its associated passage 25 in the carrier 22 is provided with a strain gauge sensor 42 for measuring the force exerted on the member 14 by the unit 21. The strain gauge sensor 42 is connected with an electrical cable 43 to the control unit 20. The strain gauge sensor 42 has a measuring head 44 which can be adjustably supported on the head coupling connection 26 on the member 14 and employs relatively movable components forming a linear potentiometer 45. The head 44 has an outer cylindrical component 46 relatively displaceable in relation to an inner cylindrical component 47 to form a linear potentiometer the resistance of which varies as the components 47,46 move longitudinally relative to one another. The inner component 47 is supported by a carrier 49 disposed coaxial with the passage 25 and suspended at 48 on the pump unit 23.

Figure 3:
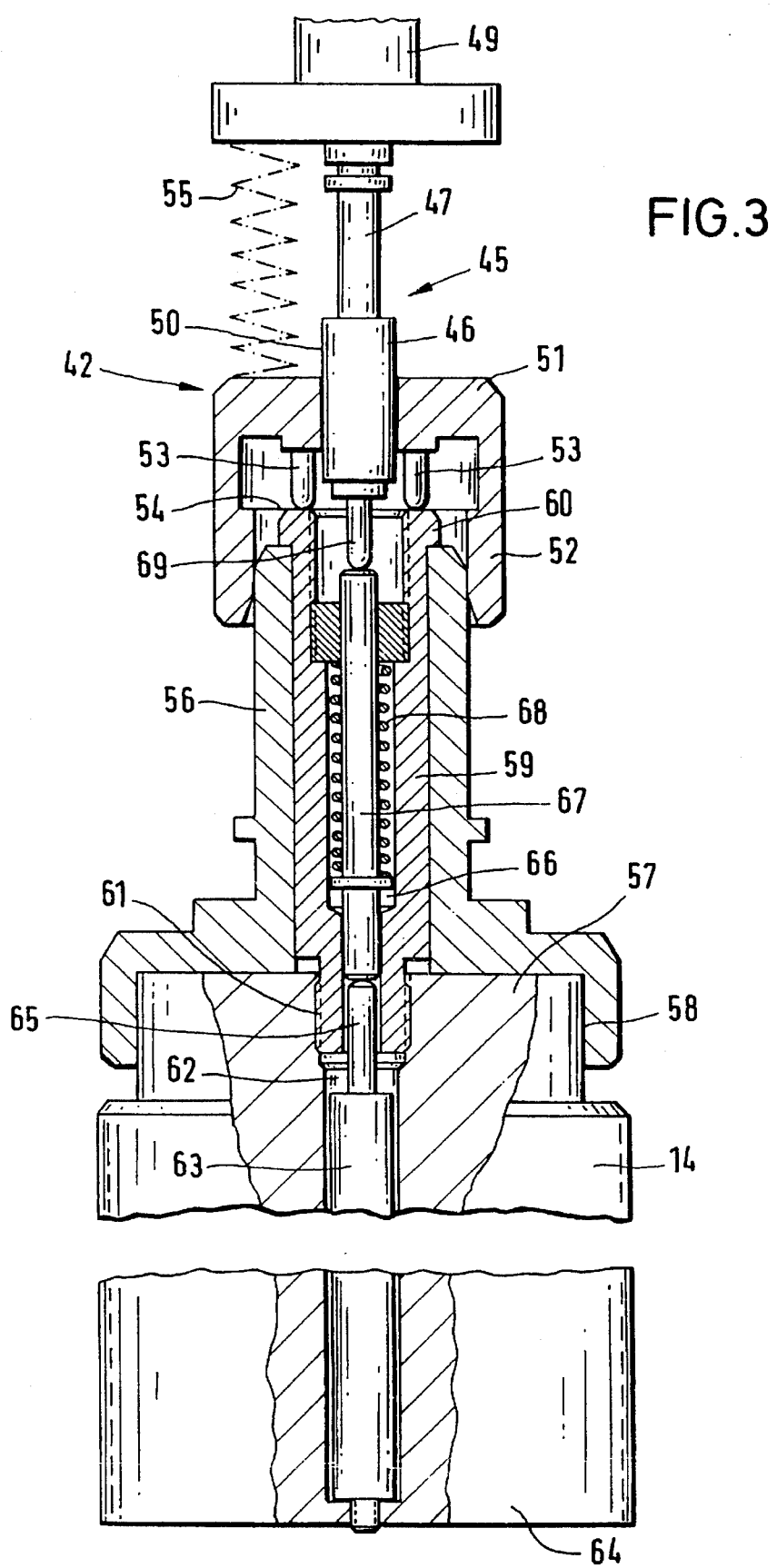

As can be seen in FIG. 3, the outer component 46 of the head 44 is connected at its periphery 50 with a cup member 51 with a depending rim 52 partly surrounding the coupling connection 26. The cup member 51 has three equi-spaced projections or feet 53 on its inside which engage on an upper end support face 54 of a collar 60 of a sleeve 59 forming part of the head coupling connection 26 on the member 14. The inner component 47 of the head 44 has a projection 69 which contacts the end of a measuring rod 67.

One or more springs 55 are supported by a flange of the carrier 49 and urge the cup member 51 against the head coupling support face 54 of the connection 26 of the member 14. In this particular embodiment, the head coupling connection 26 includes a coupling adaptor 56 for coupling a rotary drive to the member 14 to drive the latter into or out of the threaded bore in the vessel 10. The adaptor 56 is shaped internally to fit onto a polygonal region 58 of the member 14 to rotatably lock therewith. The adaptor 56 also receives the threaded sleeve 59 extending within the adaptor 56 and fitting into a tapped bore 61 in the end of the member 14. The collar 60 at the upper end of the sleeve 59 engages on the top of the adaptor 56. This renders the member 14 and the connection 26 locked in the tensile sense.

The member 14 has a central axial bore 62 which receives a first measuring rod 63 which is in screw-threaded connection with a lower base region 64 of the member 14. The rod 63 has a projection forming a reduced head 65 engaging in an axial bore 66 in the sleeve 59. The head 65 bears on the second measuring rod 67 in the bore 66. The rod 67 is subjected to the force of a spring 68 engaged between a flange of the rod 67 and an abutment ring fitted in an enlarged upper section of the bore 66. The spring 68 holds the rod 67 against the head 65 of the rod 63.

The sensor component 47 through its projection 69 thus contacts the measuring rod system 63,67 and acts as a reference for detecting axial movements of the component 46 as the member 14 and its coupling connection 26 experience tensile force.

To measure the strain on one of the members 14 when the unit 21 exerts the tensile force, the sensor 45 and the head 44 is lowered with the carrier 49 onto the coupling connection 26 of the member 14 with the rim 52 of the cup member 51 surrounding the coupling connection 26 and the feet 53 resting on the support face 54 to locate the outer component 46. The inner component 47 of the sensor 45 is located with the projection 69 engaged on the upper end of the rod 67. When the member 14 is to be braced and clamped by hydraulic force in the manner described, the member 14 undergoes strain and extension while the measuring rod system 63, 67 does not and therefore acts as a reference for the measurement. The cup member 51 with the component 46 is accordingly raised slightly as the member 14 with its coupling connection 26 extends axially and this shifts the component 46 relative to the inner component of the sensor 45. Due to this relative displacement the resistance of the sensor 42 varies and this resistance variation is detected by way of the cable connection 43.

Conveniently the carrier 49 can be a tube through which the cable 43 is passed. The electrical resistance variation which is proportional to the strain imparted on the member 14 can be displayed at the unit 20 and/or used in various ways. For example, the resistance variation can control the supply of pressure fluid to the piston and cylinder unit 21 associated with the member 14 the strain of which is being monitored. The resistance variation or measured strain can also be used to initiate or halt the drive 40 to the nut 39.

The invention is not intended to be limited to the specific features of the preferred embodiment as described and illustrated. Indeed many variations are possible without departing from the scope of the invention. As examples of such variations may be mentioned again the provision of a common carrier ring 22 disposed over the periphery of the vessel 10 and on which all the devices 16 are supported. Where space permits, each threaded member 14 may have one clamping device 16 associated therewith. The piston and cylinder units 21 of the clamping devices 16 may also take the form of two units in parallel acting on a pressure bridge supported on an abutment on the coupling adaptor 56. The linear potentiometer type sensor 45 can also be replaced by an inductive or photo-electric sensor or by an opto-electronic sensor designed to sense relative liner movement.

We claim:

1. In apparatus for use in tightening or releasing nuts engaged on screw-threaded members supported in screw-threaded bores of a pressure vessel in order to secure or release a cover of the vessel; a clamping device for subjecting the screw-threaded members to tension to permit release or tightening of the nuts thereon; said device comprising hydraulic means for exerting tensile force on one of the screw-threaded members, and a strain gauge sensor which is locatable adjacent an upper end of the screw-threaded member to detect relative movements and to produce an output representing the strain in the screw-threaded member caused by the hydraulic means, wherein the strain gauge sensor comprises a measurement head which is adjustably supported by a carrier and has a pair of components relatively displaceable axially of the screw-threaded member, and means for subjecting the components to a resilient biasing force, one of the components being locatable to displace in relation to the other of the components in accordance with the tensile force imparted to the screw-threaded member in opposition to the resilient biasing force.

2. A device according to claim 1, wherein the strain gauge sensor produces electrical output signals.

3. A device a according to claim 1, wherein the strain gauge sensor is a linear displacement sensor.

4. A device according to claim 1, wherein the one component is supportable on and displaceable with a coupling connection joined with the screw-threaded member and extendible therewith and the other component engages with a rod fitted in an axial bore in the screw-threaded member and arranged to remain fixed while the screw-threaded member extends due to the tensile force.

5. A device according to claim 4, wherein the other component engages with a further rod extending through the coupling connection and connected end-to-end with the first-mentioned rod and a spring biases the rods into contact.

6. A device according to claim 1, wherein the one component of the sensor is the combination of a cylindrical part surrounding the other component and a cup member suspended from the carrier by the resilient biasing means, the cup member having internal support projections for engaging on the end of a sleeve coupled to the screw-threaded member for extension therewith as the screw-threaded member is subjected to the tensile force.

7. A device according to claim 6, wherein the other component of the sensor is guided through the cylindrical part and the cup member and is connected directly to the carrier and to a reference means associated with the screw-threaded member which reference means remains fixed while the screw-threaded member extends due to the tensile force.

8. A device according to claim 1, wherein the components form a linear potentiometer of which the resistance changes as the relative displacement in dependence on the elongation of the screw-threaded member as a result of the tensile force and the carrier is hollow and accommodates an electrical cable for transmitting output signals from the sensor.

9. A device according to claim 4, wherein the coupling connection at least includes an adaptor connected to the end of the screw-threaded member with means resisting tensile and rotational forces therebetween and with which the screw-threaded member can be driven in or out of the screw-threaded bore.

10. A device according to claim 5, wherein the coupling connection at least includes an adaptor connected to the end of the screw-threaded member with means resisting tensile and rotational forces therebetween and with which the screw-threaded member can be driven in or out of the screw-threaded bore and the rod and the associated spring are at least partly located in a bore of the adaptor.

11. A device according to claim 10, wherein the means resisting rotational forces between the adaptor and the screw-threaded member comprises a polygonal faced contact between an interior of the adaptor and an exterior of an end region of the screw threaded member.

12. A device according to claim 11 wherein the means resisting tensile forces between the adaptor and the screw-threaded member comprises a threaded sleeve engaging through the bore of the adaptor and having a collar engaging on the end of the adaptor adjacent the sensor on which the one component of the sensor is supportable, the threaded sleeve guiding at least part of the first-mentioned rod, the further rod and the associated spring therebetween and the threaded sleeve engaging with a threaded bore within the screw-threaded member adjacent the sensor.

13. Apparatus according to claim 1, wherein the sensor is located in a passage in a base carrier for the hydraulic means which passage serves to receive the screw-threaded member.

14. Apparatus according to claim 1 wherein the sensor is located in a threaded coupling sleeve engaged with the screw-threaded member to transmit tensile force from the hydraulic means thereto and the sensor is located below a drive for rotating the sleeve onto the screw-threaded member and above a drive for rotating a nut on said screw-threaded member.

15. Apparatus according to claim 14, wherein the hydraulic means takes the form of a cylinder surrounding the threaded coupling sleeve and supported on the base carrier and an annular piston surrounding the threaded coupling sleeve and engageable through a thrust ring on a collar of the threaded coupling sleeve.

16. Apparatus according to claim 13, wherein the sensor is suspended by a carrier projecting outwardly beyond the base carrier.

17. Apparatus according to claim 13, wherein the base carrier is of ring like form for fitting onto a flange of the vessel cover around a pitch circle of the screw-threaded members and the base carrier supports a number of said clamping devices.

18. Apparatus according to claim 17, wherein the clamping devices are displacably suspended by trolleys and there is a remote control unit for controlling the nut tightening and releasing operations and for monitoring the strain in the screw-threaded members.

* * * * *